(12) United States Patent
Ho et al.

(10) Patent No.: US 8,284,360 B2
(45) Date of Patent: Oct. 9, 2012

(54) FABRICATING METHOD OF LIQUID CRYSTAL DISPLAY PANEL

(75) Inventors: Tsan-Yu Ho, Tainan County (TW); Ding-Jen Chen, Chiayi County (TW); Hsin-Chun Chiang, Hsinchu (TW); Mei-Ju Lee, Kaohsiung County (TW); Bang-Hao Wu, Kaohsiung (TW)

(73) Assignees: Taiwan TFT LCD Association, Hsinchu (TW); Chunghwa Picture Tubes, Ltd., Taoyuan (TW); Au Optronics Corporation, Hsinchu (TW); Hannstar Display Corporation, New Taipei (TW); Chi Mei Optoelectronics Corporation, Tainan County (TW); Industrial Technology Research Institute, Hsinchu (TW); TPO Displays Corp., Miao-Li County (TW)

( * ) Notice: Subject to any disclaimer, the term of this patent is extended or adjusted under 35 U.S.C. 154(b) by 0 days.

(21) Appl. No.: 13/409,012

(22) Filed: Feb. 29, 2012

(65) Prior Publication Data

US 2012/0214377 A1  Aug. 23, 2012

Related U.S. Application Data

(62) Division of application No. 11/670,423, filed on Feb. 2, 2007, now abandoned.

(30) Foreign Application Priority Data

Sep. 7, 2006 (TW) ................................ 95133022 A

(51) Int. Cl.
  *G02F 1/1337* (2006.01)
(52) U.S. Cl. ............................ 349/124; 349/129; 349/88
(58) Field of Classification Search ......................... None
  See application file for complete search history.

(56) References Cited

U.S. PATENT DOCUMENTS

| | | | |
|---|---|---|---|
| 7,326,449 B2 * | 2/2008 | Geisow et al. | 428/1.2 |
| 7,532,300 B2 * | 5/2009 | Tang et al. | 349/187 |
| 2006/0146257 A1 * | 7/2006 | Park | 349/141 |

* cited by examiner

*Primary Examiner* — Edward Glick
(74) *Attorney, Agent, or Firm* — Jianq Chyun IP Office

(57) ABSTRACT

A liquid crystal display (LCD) panel and a fabricating method thereof are described. First, a first substrate and a second substrate are provided. A liquid crystal monomer layer is then formed on the surface of at least one of the first and second substrates. Next, a curing step is performed to the liquid crystal monomer layer to induce a polymerization reaction, so as to form a liquid crystal polymer layer. Thereafter, the first and second substrates are assembled and a liquid crystal layer is filled between the first and second substrates.

6 Claims, 9 Drawing Sheets

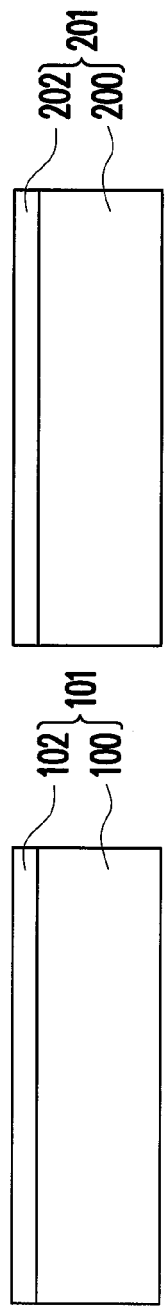
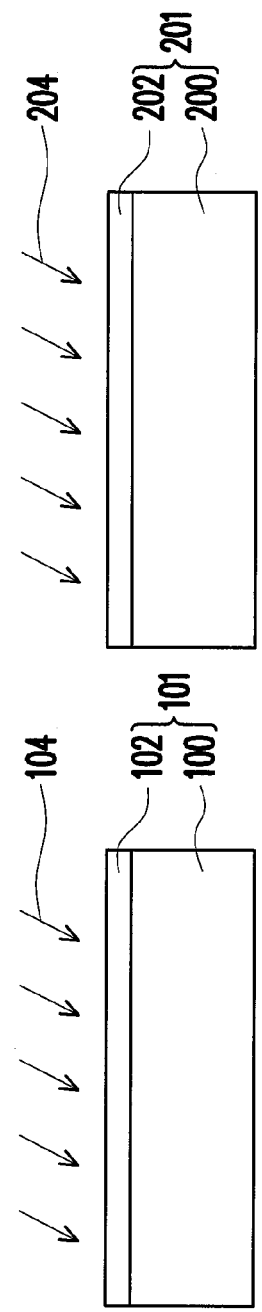
FIG. 1A
FIG. 1B

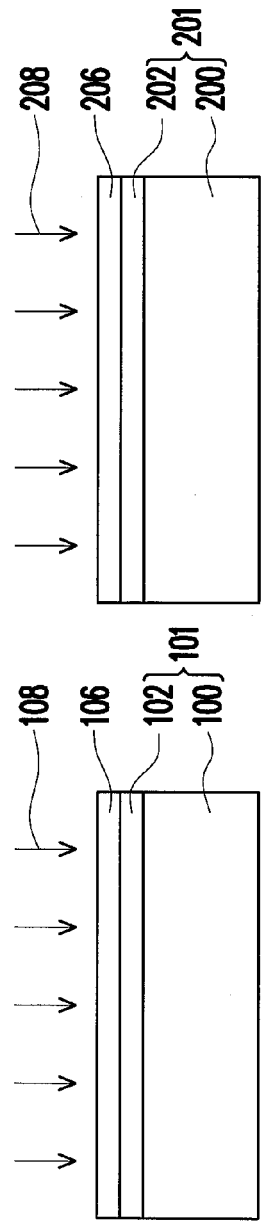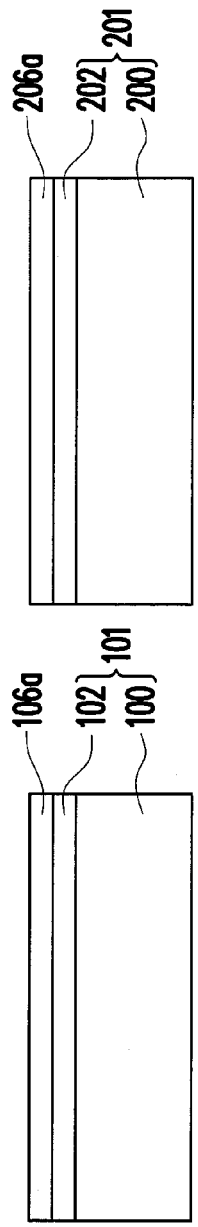
FIG. 1C
FIG. 1D

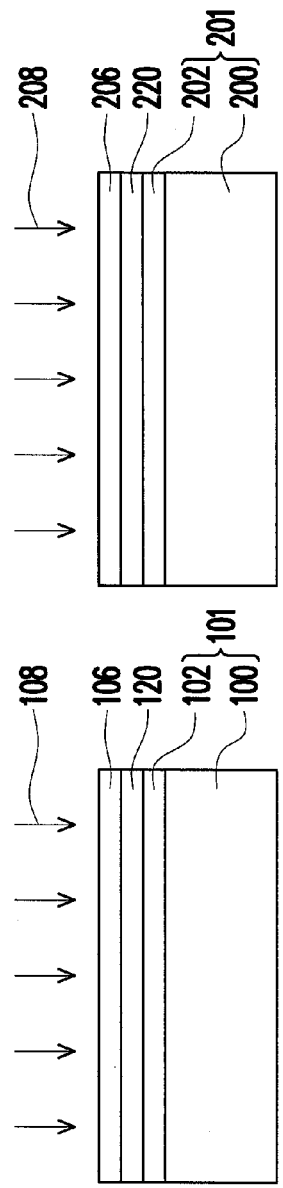
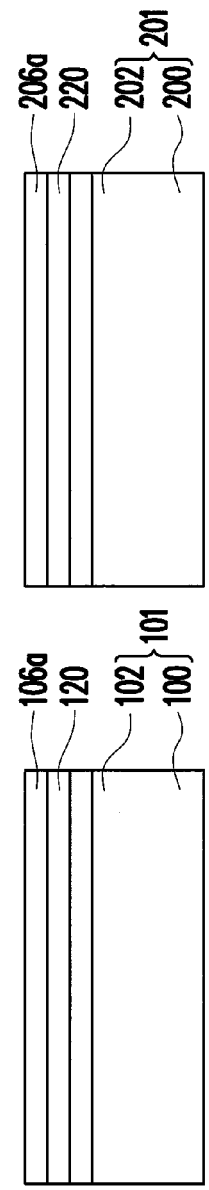
FIG. 2C
FIG. 2D

FABRICATING METHOD OF LIQUID CRYSTAL DISPLAY PANEL

CROSS-REFERENCE TO RELATED APPLICATION

This application is a Divisional of and claims the priority benefit of U.S. patent application Ser. No. 11/670,423, filed on Feb. 2, 2007, now pending, which claims the priority benefit of Taiwan application serial no. 95133022, filed on Sep. 7, 2006. The entirety of each of the above-mentioned patent applications is hereby incorporated by reference herein and made a part of this specification.

BACKGROUND OF THE INVENTION

1. Field of the Invention

The present invention relates to a display panel and a fabricating method thereof. More particularly, the present invention relates to a liquid crystal display (LCD) panel and a fabricating method thereof, wherein the problem of insufficient anchoring energy of an alignment surface in the LCD panel is resolved and the performances of the LCD panel in surface gliding and voltage-transmittance (V-T) curve shift are improved, so that the photo-electronic properties of a LCD is improved.

2. Description of Related Art

Along with the great advancement of computer performance and the rapid development of the Internet and multimedia technology, the volume of video or image apparatus is getting smaller and lighter. In the development of displays, liquid crystal displays (LCD) having such advantages as high image quality, high space efficiency, low power consumption, and no radiation have become the major products in display market along with the advancement of photo-electronic techniques and semiconductor fabricating techniques.

A LCD includes a backlight module and a LCD panel, and a conventional LCD panel is composed of two substrates and a liquid crystal layer filled between the two substrates. Generally, during the manufacturing procedure of a LCD panel, alignment films are disposed on both the substrates so that liquid crystal molecules can be arranged in a particular arrangement. A conventional method of forming an alignment layer is to perform an alignment process to an alignment material after the alignment material is coated over a substrate. The alignment process is categorized into contact alignment and non-contact alignment. Even the problems such as static produced by contact rubbing alignment and particle contamination can be resolved by non-contact alignment process, the problem of insufficient anchoring energy of the alignment surface may be caused therein. Insufficient anchoring energy of an alignment surface may result in bad display quality of the LCD panel.

SUMMARY

Accordingly, the present invention is directed to provide a liquid crystal display (LCD) panel and a fabricating method thereof, wherein the LCD panel has stronger anchoring energy and better performance in surface gliding and voltage-transmittance (V-T) curve shift, accordingly, the photo-electronic properties of the LCD are improved, for example, imaging sticking is reduced.

The present invention provides a LCD panel. The LCD panel includes a first substrate and a second substrate, at least one liquid crystal polymer layer disposed on the surface of at least one of the first and the second substrate, and a liquid crystal layer disposed between the first and the second substrate.

The present invention provides a fabricating method of a LCD panel. According to the method, a first substrate and a second substrate are provided, and then a liquid crystal monomer layer is formed on the surface of at least one of the first and the second substrate. Next, a curing step is performed to the liquid crystal monomer layer to induce a polymerization reaction and so as to form a liquid crystal polymer layer. After that, the first and the second substrate are assembled together and a liquid crystal layer is filled between the first and the second substrate.

According to the present invention, the anchoring energy of a LCD panel can be increased through a liquid crystal polymer layer. Besides, a liquid crystal polymer layer may also be formed on a film which has been performed with an alignment process to serve as an alignment assistant layer and so as to improve the alignment properties of liquid crystal molecules and to resolve the problem of insufficient anchoring energy after alignment. Accordingly, surface gliding and V-T curve shift can be reduced and the display quality of the LCD panel can be improved, for example, imaging sticking can be reduced.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A~4E are cross-sectional views illustrating the fabricating flow of a liquid crystal display (LCD) panel according to the first embodiment of the present invention.

FIGS. 2A~2E are cross-sectional views illustrating the fabricating flow of a LCD panel according to the second embodiment of the present invention.

FIG. 3 is a picture showing that serious surface gliding may be observed at the IPS electrode region when the surfaces of the first and the second substrate without liquid crystal polymer layer are aged through heating and voltage supply.

FIG. 4 is a picture showing that no surface gliding is observed at the IPS electrode region when the surfaces of the first and the second substrate with liquid crystal polymer layer are aged through heating and voltage supply.

DESCRIPTION OF EMBODIMENTS

First Embodiment

Figure 1E:
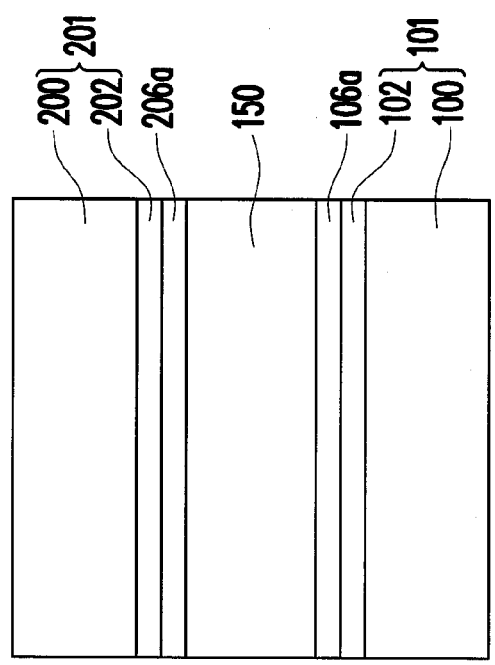

FIGS. 1A~1E are cross-sectional views illustrating the fabricating flow of a liquid crystal display (LCD) panel according to the first embodiment of the present invention. Referring to FIG. 1A, the first substrate 101 is composed of the substrate 100 and a film layer 102 formed on the substrate 100, and the second substrate 201 is composed of the substrate 200 and a film layer 202 formed on the substrate 200. The substrates 100 and 200 may be glass substrates, silicon substrates, flexible plastic substrates, or any existing substrate which can be used for fabricating display panel. If the display panel in the present invention is a passive matrix display panel, then film layer 102 and film layer 202 may be respectively an electrode layer. If the display panel in the present invention is an active matrix display panel, then film layer 102 may be an active matrix device layer, and film layer 202 may be a common electrode layer. The material of the electrode layer may be organic conductive material, such as poly (3,4-ethylene dioxythiophene) (PEDOT), or inorganic conductive material, such as indium tin oxide (ITO) or indium zinc oxide (IZO). According to other embodiments of the present invention, besides the conductive layers described above (electrode layer or active matrix device layer), the surface layers of film layer 102 and film layer 202 may also be an insulating layer, wherein an insulating layer may be further coated over the electrode layer or the active matrix device layer, and the insulating layer may be a passivation layer, a overcoat layer, or a planarization layer. The material of the insulating layer may be organic insulating material, such as organic resin or color filer layer, or inorganic insulating material, such as $SiO_x$ or $SiN_x$. Therefore, the first substrate 101 may be an active device array substrate or a passive matrix substrate, and the second substrate 201 may be a color filter substrate or a counter electrode substrate.

Referring to FIG. 1B, alignment processes 104 and 204 are respectively performed to the surfaces of the first substrate 101 and the second substrate 201. The alignment processes 104 and 204 may be particle beam alignment processes, photo alignment processes, or contact alignment processes. In an embodiment, the particle beam alignment process may be an ion beam alignment process, an electron beam alignment process, a plasma alignment process, or an oblique evaporation alignment process. Namely, non-contact alignments are performed to the surfaces of the first substrate 101 and the second substrate 201 by using ion beam, electron beam, plasma, or oblique evaporation. In addition, the contact alignment process may be a rubbing alignment process, nano imprinting alignment process, or an atomic force microscopy probe contact alignment process. Moreover, photo alignment process may be a photo-polymerization alignment process, a photo-decomposition alignment process, or a photo-isomerization alignment process. The foregoing photo alignment process is a non-contact alignment process, wherein the surfaces of the first substrate 101 and the second substrate 201 are illuminated to induce polymerization reaction, decomposition reaction, or isomerization reaction. The isomerization reaction refers to transformation from trans-structure to cis-structure or from cis-structure to trans-structure.

According to another embodiment of the present invention, the alignment processes 104 and 204 may be multi-domain alignment processes, namely, a multi-domain alignment process is performed to the surfaces of the first substrate 101 and the second substrate 201. Thus, different areas on the surfaces of the first substrate 101 and the second substrate 201 have different alignment directions. Moreover, the multi-domain alignment process may be performed along with at least one of the particle beam alignment process, the photo alignment process and the contact alignment process to accomplish the purpose of multi-domain alignment.

Then referring to FIG. 1C, liquid crystal monomer layers 106 and 206 are formed respectively on the surfaces of the aligned first substrate 101 and second substrate 201. The method for forming liquid crystal monomer layers 106 and 206 on the surface of the first substrate 101 and the second substrate 201 may be spin coating, slot die coating, screen printing, evaporation, relief printing, inkjet printing, or any coating method. In addition, the liquid crystal monomer layers 106 and 206 may be homogeneous type liquid crystal monomers, homeotropic type liquid crystal monomers, or mixed type monomers. The liquid crystal monomer layers 106 and 206 may also be multi-layer liquid crystal monomers composed of at least one of homogeneous type liquid crystal monomers, homeotropic type liquid crystal monomers, or mixed type monomers. In an embodiment of the present invention, a homogeneous type liquid crystal monomer may be a compound as shown in chemical formula (I), which may be referred to U.S. Pat. No. 6,597,422.

Chemical Formula (I)

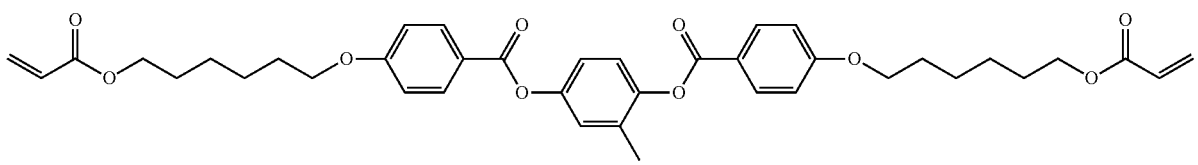

After that, curing steps 108 and 208 are performed to the liquid crystal monomer layers 106 and 206 in FIG. 1C to induce polymerization reactions in the liquid crystal monomer layers 106 and 206, so as to form liquid crystal polymer layers 106a and 206a, as illustrated in FIG. 1D. In an exemplary embodiment, the foregoing curing steps 108 and 208 may be illuminating steps (such as UV exposure) or heating steps. Next, referring to FIG. 1E, the first substrate 101 and the second substrate 201 are assembled together and a liquid crystal layer 150 is filled between the first substrate 101 and the second substrate 201.

In the present embodiment, besides performing alignment processes to the surfaces of the first substrate 101 and the second substrate 201, liquid crystal polymer layers 106a and 206a are further formed on the surfaces of the aligned first substrate 101 and second substrate 201, wherein the liquid crystal polymer layers 106a and 206a may be served as alignment assistant layers to resolve the problem of insufficient anchoring energy produced by conventional non-contact alignment process, and further to improve the display quality of the LCD panel.

In the embodiment described above, alignment processes are performed on both substrates and liquid crystal polymer layers are formed on both substrates, however, the present invention is not limited thereto, instead, it could be only one substrate that is performed with an alignment process and formed with a liquid crystal polymer layer thereon.

Moreover, according to the present invention, liquid crystal polymer layers may also be formed directly on the surfaces of the first substrate 101 and the second substrate 201 without performing alignment process additional, namely, the step in FIG. 1B is skipped after the step illustrated in FIG. 1A, instead, the step of coating the liquid crystal monomer layers 106 and 206 illustrated in FIG. 1C is performed directly, and the curing steps 108 and 208 are performed to form the liquid crystal polymer layers 106a and 206a as shown in FIG. 1D. Since alignment process does not have to be performed to a typical vertical alignment LCD panel, the method for improving display quality of a LCD panel by using liquid crystal polymer layers provided by the present invention may also be applied to a vertical alignment LCD panel which does not require alignment processing.

The method of the present invention may also be applied to existing LCD panels which need alignment material, and such application will be described in detail in the second embodiment.

Second Embodiment

Figure 2A:
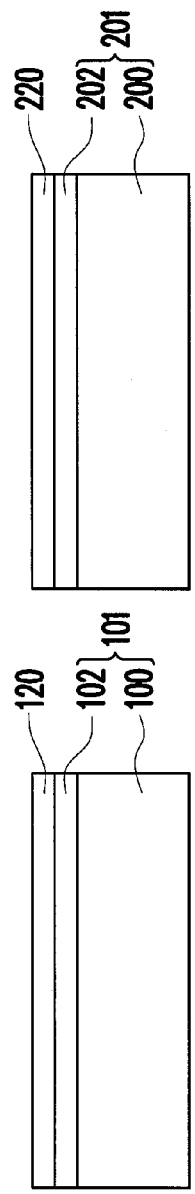

FIGS. 2A~2E are cross-sectional views illustrating the fabricating flow of a LCD panel according to the second embodiment of the present invention. Referring to FIG. 2A, a first substrate 101 and a second substrate 201 are provided first. The composition and material of the first substrate 101 and the second substrate 201 are as those described in the first embodiment, therefore will not be described herein. Next, a first alignment material layer 120 and a second alignment material layer 220 are respectively formed on the surfaces of the first substrate 101 and the second substrate 201. The first and the second alignment material layers 120 and 220 may be an organic alignment material or an inorganic alignment material. In an embodiment, the organic alignment material includes poly vinyl alcohol, polyimide, polyamic acid, azobenzene, poly vinyl cinnamate, compound containing coumarin group, compound containing chalcone group, or other existing organic alignment material. In another embodiment, the inorganic alignment material includes diamond-like carbon, $SiO_x$, $SiN_x$, or other existing inorganic alignment material.

Figure 2B:
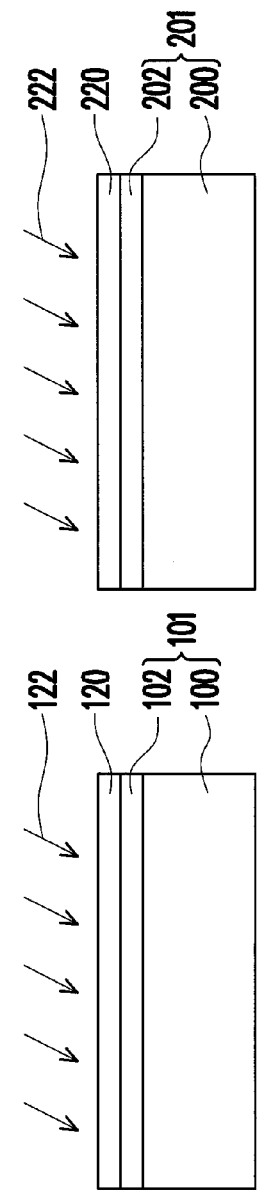
Figure 2E:
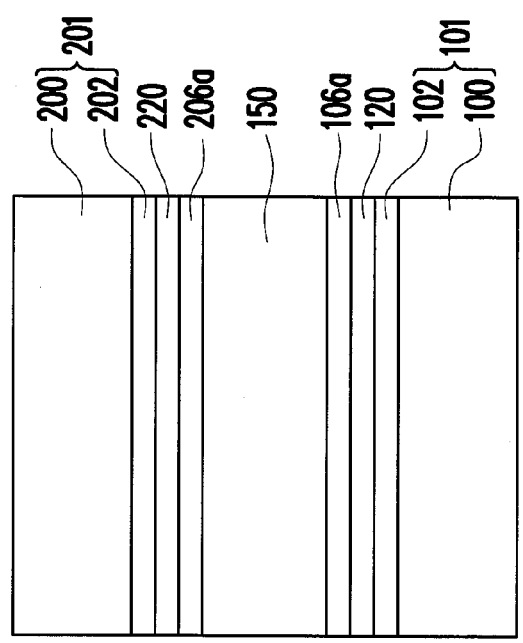

Then referring to FIG. 2B, alignment processes 122 and 222 are respectively performed to the first and the second alignment material layers 120 and 220. In an embodiment, the alignment processes 122 and 222 may be particle beam alignment processes, photo alignment processes, or contact alignment processes. In an embodiment, the foregoing particle beam alignment process may be an ion beam alignment process, an electron beam alignment process, a plasma alignment process, or an oblique evaporation alignment process. The contact alignment process may be a rubbing alignment process, a nano imprinting alignment process, or an atomic force microscopy probe contact alignment process. The photo alignment process may be a photo-polymerization alignment process, a photo-decomposition alignment process, or a photo-isomerization alignment process. Similarly, the foregoing alignment processes 122 and 222 may also be multi-domain alignment processes described above.

Next, referring to FIG. 2C, liquid crystal monomer layers 106 and 206 are formed on the aligned first and second alignment material layers 120 and 220. The material of the liquid crystal monomer layers 106 and 206 is the same or similar to that in the first embodiment. After that, curing steps 108 and 208 are performed to the liquid crystal monomer layers 106 and 206 in FIG. 2C to induce polymerization reactions on the liquid crystal monomer layers 106 and 206, so as to form liquid crystal polymer layers 106a and 206a, as illustrated in FIG. 2D. In an exemplary embodiment, the curing steps 108 and 208 may be illuminating steps (such as UV exposure) or heating steps. After that, referring to FIG. 2E, the first substrate 101 and the second substrate 201 are assembled together and a liquid crystal layer 150 is filled between the first substrate 101 and the second substrate 201.

In the present embodiment, besides performing alignment processes to the first and the second alignment materials, liquid crystal polymer layers 106a and 206a are further formed on the aligned first and second alignment material layers, wherein the liquid crystal polymer layers 106a and 206a may be used as alignment assistant layers for resolving the problem of insufficient anchoring energy caused when conventional non-contact alignment processes are used, and further to improve the display quality of the LCD panel.

Moreover, in the embodiment described above, alignment processes are performed to the alignment material layers of both substrates and liquid crystal polymer layers are formed on both substrates, however, the present invention is not limited thereto, instead, it could also be that only one of the two substrates is performed with an alignment process and formed with a liquid crystal polymer layer thereon.

In the embodiment described above, alignment material layers are formed on the two substrates and alignment processes are performed to the alignment material layers, however, according to the present invention, liquid crystal polymer layers may also be formed directly on the alignment material layers without performing alignment process. Namely, the step in FIG. 2B is skipped after the step illustrated in FIG. 2A, and the step of coating the liquid crystal monomer layers 106 and 206 illustrated in FIG. 2C are performed directly, and the curing steps 108 and 208 are performed to form the liquid crystal polymer layers 106a and 206a as shown in FIG. 2D. Since alignment process does not have to be performed to a typical vertical alignment LCD panel, the method for improving display quality of a LCD panel by using liquid crystal polymer layers provided by the present invention may also be applied to a vertical alignment LCD panel which does not requirement alignment processing.

Several examples will be described below to show that the method of using liquid crystal polymer layers as alignment assistant layers in the present invention can improve the display quality of a LCD panel, however, these examples are not for limiting the present invention. Referring to table 1, the alignment material RD-100 is manufactured by ELSICON company, the alignment material PIA-5310-06C is manufactured by CHISSO company, and the alignment materials SE-7492 and RN-1349 are manufactured by NISSAN company. Besides, liquid crystal polymer layers are formed in the LCD panel to serve as alignment assistant layers in examples 1~5, while no liquid crystal polymer layers is used as alignment assistant layer in the comparative examples 1~5. "OK' in surface gliding test represents that the alignment surface has anchoring energy of acceptable quality, while "X" represents that the anchoring energy of the alignment surface is insufficient. The testing method and theory can be referred to the document (LCT3-3) published by T. Suzuki etc in IDW2005. Moreover, "OK" in V-T curve shift test represents that the LCD panel has stable photo-electronic properties, while "X" represents that the photo-electronic properties of the LCD panel are not good.

TABLE 1

|  | Alignment material | Alignment process | Liquid crystal polymer layer | Surface gliding test | V-T curve shift test |
|---|---|---|---|---|---|
| Example 1 | RD-100 | Illuminating | Yes | OK | OK |
| Comparative example 1 | RD-100 | Illuminating | No | X | X |
| Example 2 | RN-1349 | Illuminating | Yes | OK | OK |

TABLE 1-continued

| | Alignment material | Alignment process | Liquid crystal polymer layer | Surface gliding test | V-T curve shift test |
|---|---|---|---|---|---|
| Comparative example 2 | RN-1349 | Illuminating | No | X | X |
| Example 3 | RD-100 | Ion beam | Yes | OK | OK |
| Comparative example 3 | RD-100 | Ion beam | No | X | X |
| Example 4 | PIA-5310-06C | Ion beam | Yes | OK | OK |
| Comparative example 4 | PIA-5310-06C | Ion beam | No | X | X |
| Example 5 | SE-7492 | Rubbing | Yes | OK | OK |
| Comparative example 5 | SE-7492 | Rubbing | No | OK | OK |

An example and a comparative example are further illustrated in table 2 below to describe that the anchoring energy in a LCD panel can be improved in the present invention by using liquid crystal polymer layers as alignment assistant layers. However, these examples are not intended to limiting the present invention. As shown in table 2, the anchoring energy in example 1 is obviously higher than that in comparative example 1 because liquid crystal polymer layers are used as alignment assistant layers.

TABLE 2

| | Alignment material | Alignment process | Liquid crystal polymer layer | Anchoring energy (J/m$^2$) |
|---|---|---|---|---|
| Example 1 | RD-100 | Illuminating | Yes | 9.17E−05 |
| Comparative example 1 | RD-100 | Illuminating | No | 1.37E−05 |

Figure 3:
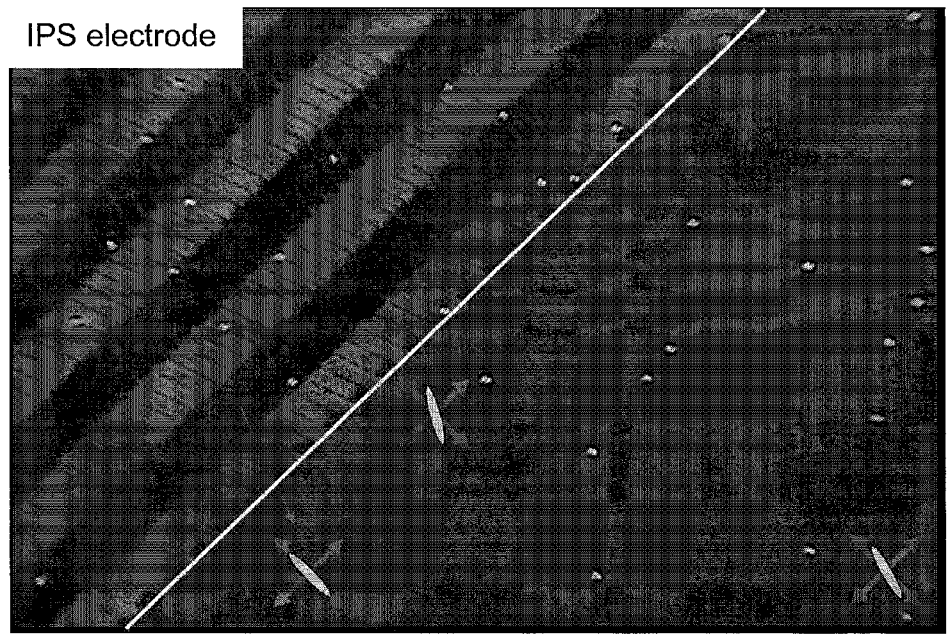
Figure 4:
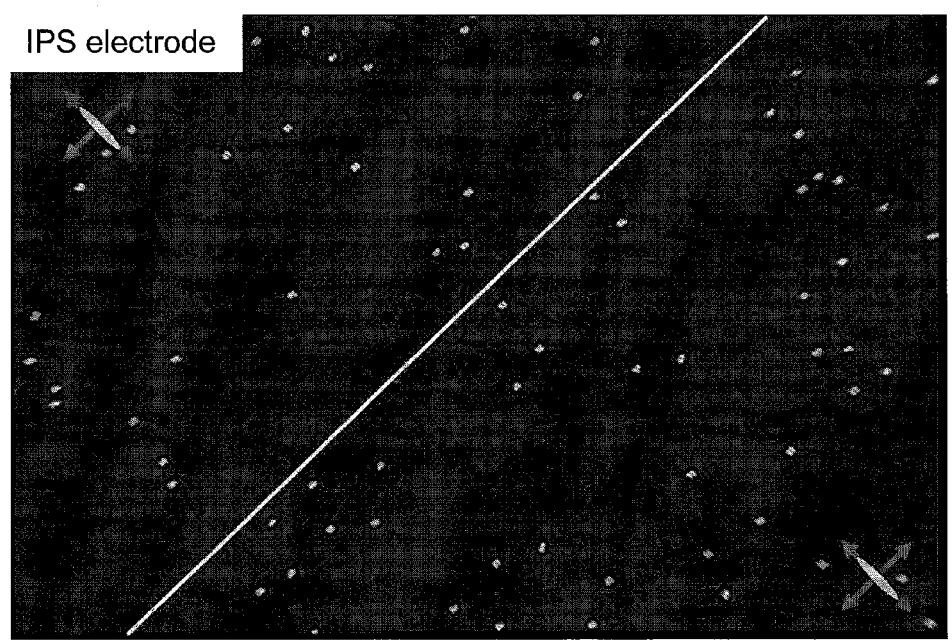

In addition, the surface gliding observed at the electrode region when the surfaces of the first and the second substrate without liquid crystal polymer layer are aged through heating and voltage supply (top left part of FIG. 3) and the surface gliding observed at the electrode region when the surfaces of the first and the second substrate with liquid crystal polymer layers are aged through heating and voltage supply (top left part in FIG. 4) are further illustrated. In FIG. 3, serious surface gliding can be observed, while in FIG. 4, no surface gliding is observed.

Figure 5:
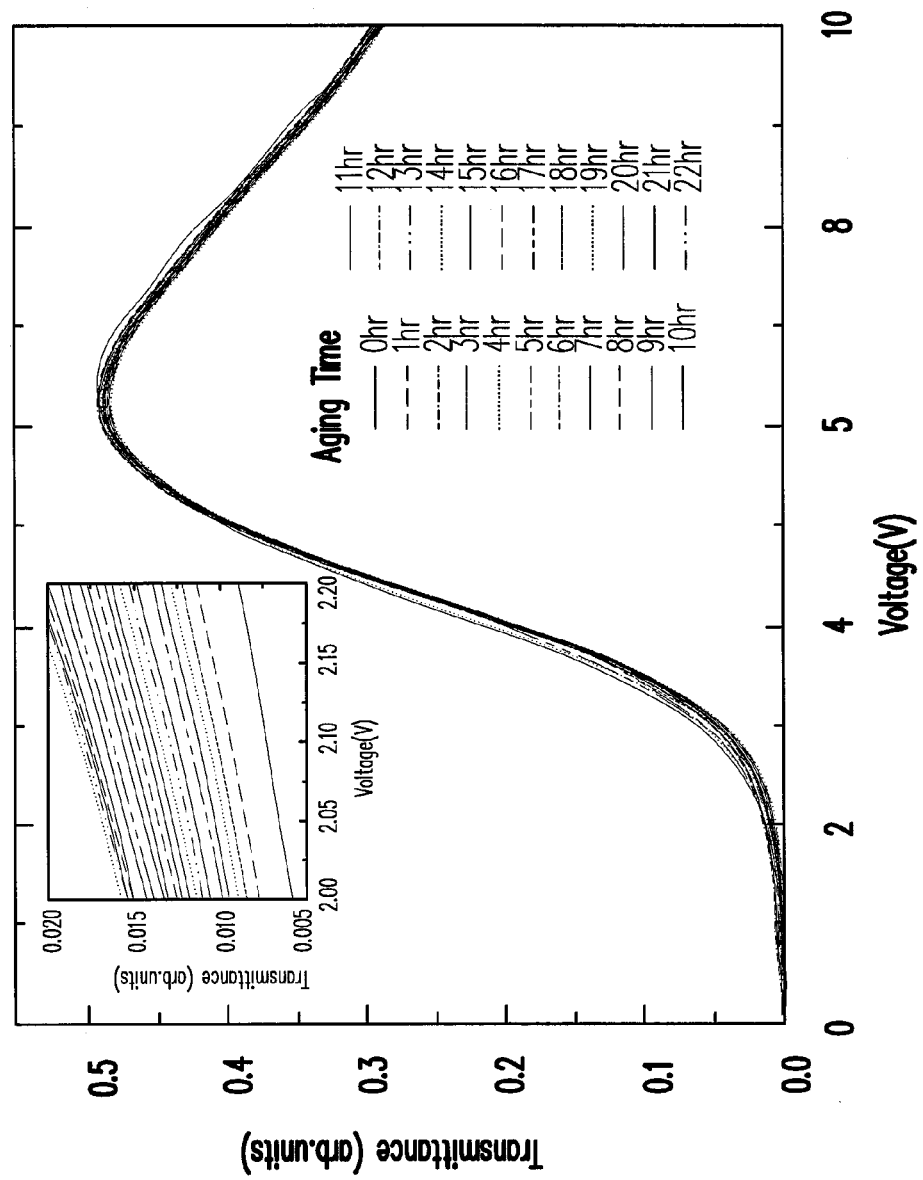
FIG. 5 is a graph showing the surfaces of the first and the second substrate have serious V-T curve shift when no liquid crystal polymer layer is formed thereon.
Figure 6:
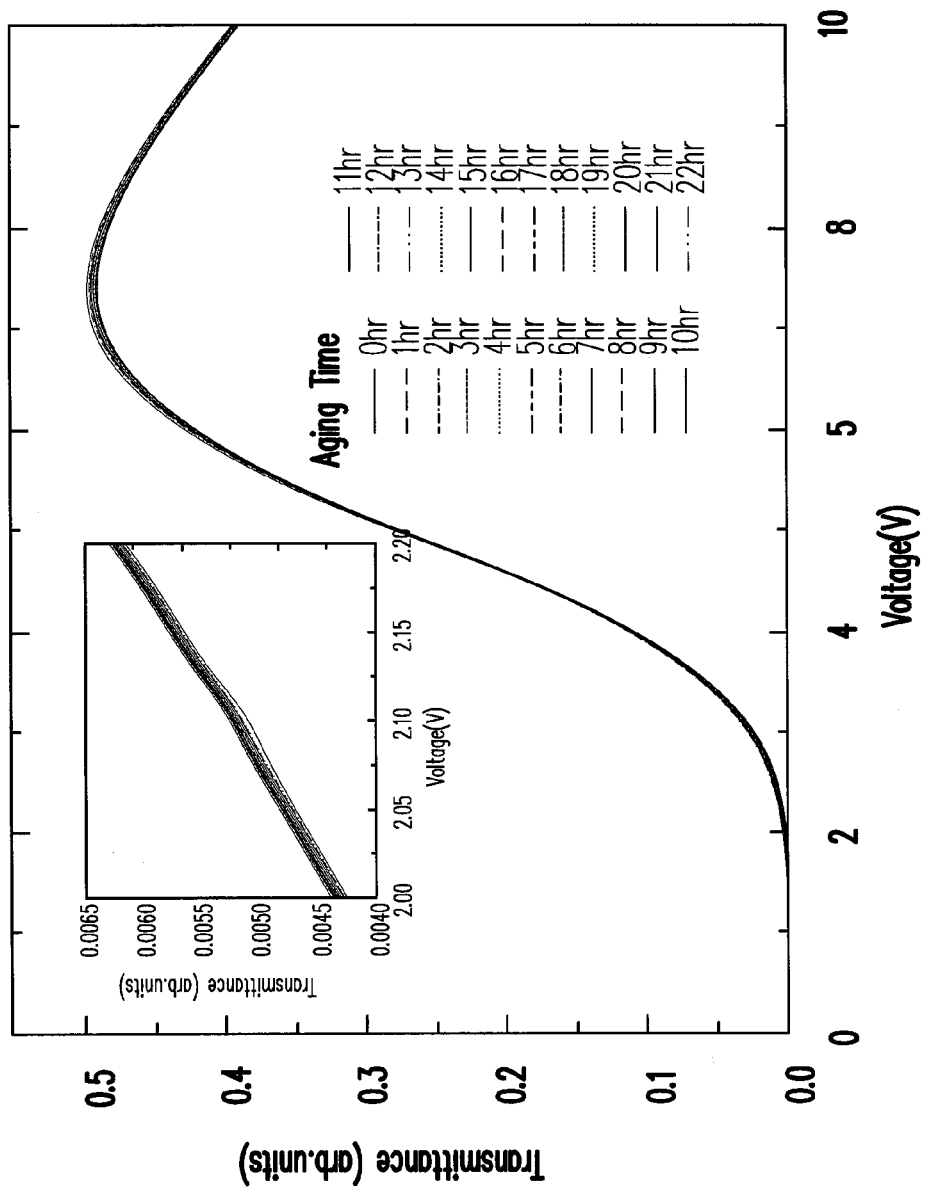
FIG. 6 is a graph showing the surfaces of the first and the second substrate have very slight V-T curve shift when liquid crystal polymer layers are formed respectively on the surfaces of the first and the second substrate.

Moreover, the situation of V-T curve shift when no liquid crystal polymer layer is formed on the surfaces of the first and the second substrate (as shown in FIG. 5), and the situation of V-T curve shift when liquid crystal polymer layers are formed thereon (as shown in FIG. 6) are illustrated. In FIG. 5, serious V-T curve shift can be observed, while in FIG. 6, there is only very slight V-T curve shift.

In overview, the present invention has following advantages:

1. In the present invention, liquid crystal polymer layers are formed in a LCD panel to increase the anchoring energy of the LCD panel and to improve the performance of the LCD panel in surface gliding and V-T curve shift, so that the photo-electronic properties of the LCD panel can be improved, for example, imaging sticking is reduced.

2. According to an embodiment of the present invention, liquid crystal polymer layers are further formed on the aligned surfaces of the substrates to serve as alignment assistant layers after performing alignment processes to the substrates. Even the alignment processes performed previously are non-contact alignment processes, the alignment anchoring energy, and further the display quality of the LCD panel, can still be improved greatly due to the alignment assistance function of the liquid crystal polymer layers.

3. The present invention may also be applied to an existing LCD panel having alignment material layers therein, that is, liquid crystal polymer layers are further formed on the aligned alignment material to serve as alignment assistant layer after alignment processes have been performed to the alignment material. Due to the alignment assistance function of the liquid crystal polymer layers, the problem of insufficient anchoring energy caused when conventional non-contact alignment processes are performed can be resolved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fabricating method of a liquid crystal display (LCD) panel, comprising:
   providing a first substrate and a second substrate, wherein at least one of the first and the second substrates has a conductive layer thereon;
   performing an alignment process to the conductive layer on the at least one of the first and the second substrates, such that the conductive layer on the at least one of the first substrate and the second substrate has an aligned surface, wherein the alignment process comprises a particle beam alignment process or a photo alignment process;
   forming a liquid crystal monomer layer on the aligned surface of the conductive layer on the at least one of the first and the second substrates directly;
   performing a curing step to the liquid crystal monomer layer to induce a polymerization reaction, so as to form a liquid crystal polymer layer; and
   assembling the first and the second substrates and filling a liquid crystal layer between the first and the second substrates.

2. The fabricating method as claimed in claim 1, wherein the curing step comprises an illuminating step or a heating step.

3. The fabricating method as claimed in claim 1, wherein the first substrate is an active device array substrate or a passive matrix substrate, and the second substrate is a color filter substrate or a counter electrode substrate.

4. The fabricating method as claimed in claim 1, wherein the alignment process is a multi-domain alignment process.

5. The fabricating method as claimed in claim 4, wherein the multi-domain alignment process is performed along with at least one of the particle beam alignment process, the photo alignment process and the contact alignment process.

6. The fabricating method as claimed in claim 1, wherein the conductive layer is an electrode layer.

* * * * *